United States Patent Office 2,772,300
Patented Nov. 27, 1956

2,772,300

DITHIO-DIOCTANOIC ACIDS AND METHODS OF OBTAINING THE SAME

Arthur F. Wagner, Princeton, N. J., assignor to Merck & Co., Inc., Rahway, N. J., a corporation of New Jersey No Drawing. Application July 22, 1954,
Serial No. 445,170

32 Claims. (Cl. 260—399)

This invention relates to α-lipoic acid and is particularly concerned with novel disulfide compounds having α-lipoic acid activity.

α-Lipoic acid, also called 5-[3-(1,2-dithiacyclopentyl)] pentanoic acid, is a valuable growth stimulating substance. Other related compounds have also been prepared which have α-lipoic acid activity but the activity possessed by such compounds is very much less than exerted by α-lipoic acid.

It is therefore an object of this invention to provide novel compounds having α-lipoic acid activity. It is also an object to provide novel compounds which can be converted to racemic α-lipoic acid and the (+) and (−) enantiomorphs thereof. An additional object is to provide novel processes of producing such compounds and intermediate compounds useful in such processes. A further object is to provide new and novel chemical compounds of general use.

According to one embodiment of the present invention there are provided novel disulfide compounds of the formula

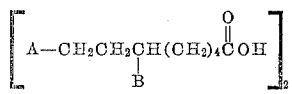

wherein A and B represent members of the group consisting of thio and thiol groups, one of which is thio. The disulfide compounds represented by this formula, it is seen, are position isomers having the disulfide linkage at the 6,6' or 8,8' positions and may be named respectively: 6,6'-dithiobis (8-thioloctanoic acid) and 8,8-dithiobis (6-thioloctanoic acid). Such compounds have α-lipoic acid activity and may be converted to α-lipoic acid as disclosed hereinafter.

The novel disulfides of the above formula are conveniently produced starting with 6-thio-8-hydroxyoctanoic acid or an ester thereof, including polyesters thereof, to produce the 6,6' disulfide and with 6-hydroxy-8-thioloctanoic acid or an ester thereof to produce the isomeric 8,8' disulfide. The first named of these starting materials may be conveniently prepared according to one method which comprises reacting racemic 7-carboethoxy-2-heptanoic acid with thioacetic acid to produce the corresponding 3-acetylthio-7-carboethoxy heptanoic acid, converting said compound or (+) and (−) enanthiomorphs thereof to the corresponding heptanoyl chloride, reacting said compound with sodium borohydride to produce the corresponding ethyl 6-acetylthio-8-hydroxyoctanoate and treating said compound with a base and then acid to form the corresponding racemic 6-thio-8-hydroxyoctanoic acid or the (+) and (−) enantiomorphs as the free acid or ethyl ester thereof as is more fully described in U. S. patent application Serial No. 445,165, filed July 22, 1954. 6-thiol-8-hydroxyoctanoic acid is often obtained from such processes as a polyester but in such form is nevertheless suitable for use in this invention. Methods of preparing the isomeric 6-hydroxy-8-thioloctanoic acid are disclosed in the J. Am. Chem. Soc. 74, 3455 (1952).

Production of the desired 6,6' and 8,8' disulfides is readily achieved by the same process from the appropriate starting material. For the purpose of avoiding unnecessary duplication, however, this process shall be described in particular detail as it applies to production of the 6,6' disulfide: 6,6'-dithiobis (8-thioloctanoic acid), it being understood of course that such methods are equally applicable to production of the isomeric 8,8' disulfide: 8,8'-dithiobis (6-thioloctanoic acid).

The desired 6,6'-dithiobis (8-thioloctanoic acid) is conveniently produced by reacting 6-thio-8-hydroxyoctanoic acid or mono or polyesters thereof (I), with an oxidizing agent to produce 6,6'-dithiobis (8-hydroxyoctanoic acid) or a diester thereof (II), reacting said compound with thiourea or an N-substituted thiourea in the presence of a strong acid to form 6,6'-dithiobis{8-[2(2-thiopseudoureido)] octanoic acid} or the corresponding N-substituted thiopseudoureide as the corresponding acid addition salt (III), hydrolyzing said compound with an inorganic base to form the corresponding tetrametal salt of 6,6'-dithiobis (8-thioloctanoic acid) (IV), and treating said salt with acid to obtain 6,6'-dithiobis (8-thioloctanoic acid) (V). This process may be represented as follows:

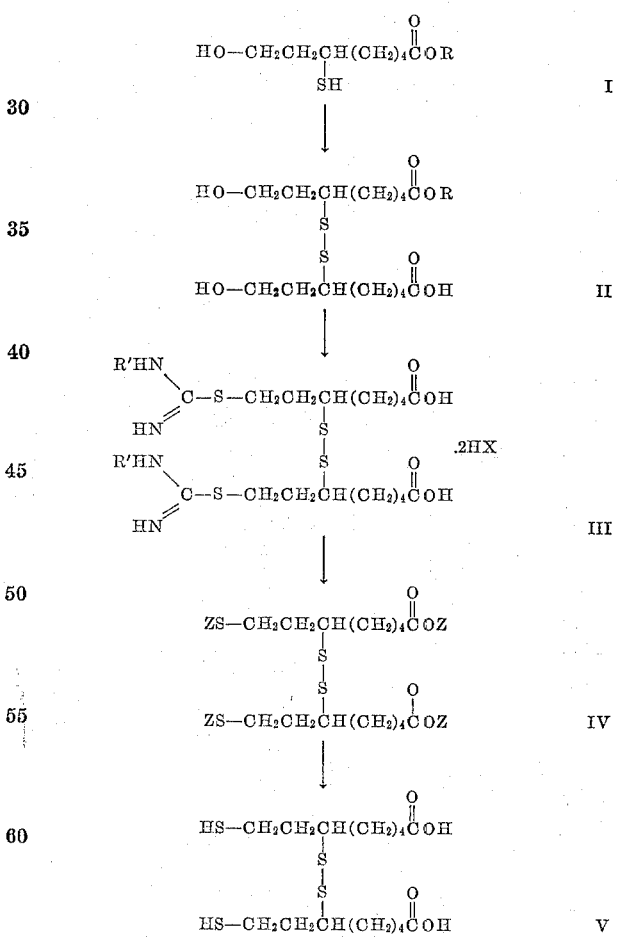

wherein R and R' are hydrogen or hydrocarbon groups such as alkyl, alkenyl, aryl and aralkyl groups, preferably of 1 through 8 carbons, X is an anion of a strong acid and Z is a metal such as an alkali metal or alkaline earth metal.

In the first step of this process 6-thiol-8-hydroxyoctanoic acid or an ester thereof is contacted with an oxidizing agent, preferably under solvent conditions, to produce 6,6'-dithiobis (8-hydroxyoctanoic acid) or the corresponding diester thereof. Solvents such as water, lower alcohols as methanol and ethanol, and ethyl acetate may be used as the reaction medium. Any mild oxidizing agent may be used for effecting the reaction but it is generally most convenient to employ an aqueous mixture of iodine-potassium iodide, preferably of about 5–20% and more preferably of about 10% concentration for this purpose. The reaction goes to completion readily at room temperature. After completion of the reaction the excess iodine is reduced, such as by contacting the reaction mixture with sodium bisulfite, followed by isolation of the product by conventional methods. One such isolation procedure is to extract the product with a water immiscible organic solvent, re-extract the product into water as a salt, acidify the aqueous solution and again extract the product with a water immiscible solvent followed by evaporation of the solvent to obtain the desired 6,6'-dithiobis (8-hydroxyoctanoic acid). The diesters of 6,6'-dithiobis (8-hydroxyoctanoic acid) may be recovered by separating the organic layer, washing with water and concentrating to dryness. Similarly, the isomeric 6-hydroxy-8-thiol-octanoic acid and esters thereof are oxidized to produce 8,8'-dithiobis(6-hydroxyoctanoic acid) and diesters thereof. Examples of diesters which may be produced according to this process by oxidation of the corresponding esters of 6-thiol-8-hydroxyoctanoic acid and the isomeric 6-hydroxy-8-thioloctanoic acid are the dimethyl, diethyl, dipropyl, diallyl, dibutyl, diphenyl, dibenzyl and diphenylethyl esters of 6,6'-dithiobis (8-hydroxyoctanoic acid) and 8,8'-dithiobis (6-hydroxyoctanoic acid).

In the next reaction 6,6'-dithiobis (8-hydroxyoctanoic acid) or a diester thereof is reacted with thiourea or an N-substituted thiourea to produce 6,6'-dithiobis{8[2(2-thio-pseudoureido)]octanoic acid} or the corresponding N-substituted thiopseudoureide. Examples of N-substituted thioureas which may be used in this reaction are N-hydrocarbon substituted thioureas such as N-methylthiourea, N-ethylthiourea, N-phenylthiourea, and N-benzylthiourea. The desired reaction is conveniently achieved by contacting the reactants in the presence of a strong nonoxidizing acid in aqueous solution at room temperature or elevated temperatures, preferably at reflux temperature. Hydrochloric acid, hydriodic acid, hydrobromic acid and sulfuric acid, and Lewis acids, e. g. boron trifluoride and aluminum chloride in anhydrous solvent media are examples of acids suitable for use in this reaction. The reaction goes to completion in from about 3 to 20 hours, the shorter reaction periods being adequate at elevated temperatures. The direct product of reaction is 6,6'-dithiobis{8[2(2-thiopseudoureido)]octanoic acid}, or a corresponding N-substituted thiopseudoureide, in the form of an acid addition salt corresponding to the acid employed to induce reaction.

This process is conveniently illustrated by the reaction of 6,6'-dithiobis (8-hydroxyoctanoic acid) with thiourea in the presence of hydrochloric acid to produce 6,6'-dithiobis {8 [2(2 - thiopseudoureido)] octanoic acid} di-hydrochloride. Similarly, compounds such as 6,6'-dithiobis{8-[2(1-methyl - 2 - thiopseudoureido)]octanoic acid}, 6,6'-dithiobis{8-[2(1-ethyl-2-thiopseudoureido)] octanoic acid}, 6,6'-dithiobis{8-[2(1-propyl-2-thiopseudoureido)]octanoic acid}, 6,6'-dithiobis{8-[2(1-phenyl-2-thiopseudoureido)]octanoic acid}, 6,6'-dithiobis{8-[2(1-benzyl-2-thiopseudoureido)]octanoic acid} may be produced as the dihydrochloride, dihydrobromide, disulfate and other acid addition salts by employing the corresponding N-substituted thiourea and acid in the reaction. Likewise, by reacting 8,8'-dithiobis (6-hydroxyoctanoic acid) or a diester thereof with thiourea or an N-sub-situted thiourea in the presence of hydrochloric acid the isomeric 8,8'-dithiobis{6[2-(2-thiopseudoureido)] octanoic acid}dihydrochloride or the corresponding N-substituted compound is obtained. Other acid addition salts besides the dihydrochloride are produced as previously indicated.

Treatment of the acid addition salts of 6,6'-dithiobis {8-[2(2-thiopseudoureido)] octanoic acid}, 8,8'-dithiobis {6-[2(2-thiopseudoureido)] octanoic acid} and the related N-substituted thiopseudoureido compounds with a quantity of a base sufficient to neutralize the acid of addition results in production of the corresponding free bases. This neutralization may be readily effected by contacting such compounds with a base such as an alkali metal or alkaline earth metal carbonate or hydroxide, i. e., sodium hyroxide, potassium carbonate and calcium carbonate, in aqueous solution. After the desired free base is formed it may be isolated such as by evaporating the mixture to dryness, extracting the product with an organic solvent and subsequently removing the solvent to separate the product.

Although the free bases may be produced as described, it is usually preferable to employ a sufficient amount of inorganic base to produce the corresponding tetrametal salt directly. Thus, by reacting 6,6'-dithiobis {8-[2(2-thiopseudoureido)] octanoic acid} with sufficient sodium hydroxide there is produced the tetrasodium salt of 6,6'-dithiobis(8-thioloctanoic acid). This reaction is conveniently effected in aqueous solution at ordinary or elevated temperatures such as the reflux temperature and preferably employing an excess of the base. After the reaction has been completed the resulting salt may be recovered, if desired, by conventional techniques.

Similarly, by reacting the isomeric 8,8'-dithiobis {6-[2(2-thiopseudoureido)] octanoic acid} with a base such as sodium hydroxide the tetrasodium salt of 8,8'-dithiobis(6-thioloctanoic acid) is formed. By selection and use of other inorganic bases, such as potassium, calcium and magnesium carbonates or hydroxides the corresponding salts of 6,6'-dithiobis (8-thioloctanoic acid) and 8,8'-dithiobis (6-thioloctanoic acid) are obtained. In addition, as previously indicated the N-substituted thiourea derivatives may be similarly hydrolyzed with inorganic bases to produce the desired products.

In the last step in this process the tetrametal salts of 6,6'-dithiobis (8-thioloctanoic acid) and 8,8'-dithiobis (6-thioloctanoic acid) produced above are treated with acid to form, respectively, 6,6'-dithiobis(8-thioloctanoic acid) and 8,8'-dithiobis (6-thioloctanoic acid). This conversion may be readily achieved by the use of acids such as hydrochloric acid, sulfuric acid, and the like. Reaction may be effected under aqueous conditions at ordinary temperatures although elevated temperatures are also suitable. Following completion of the reaction, the product may be recovered by extraction with an immiscible solvent and isolated by evaporation of the solvent.

According to another embodiment of the present invention there is provided a novel, direct method of converting DL-6,6'-dithiobis (8-hydroxyoctanoic acid) and (+) and (−) enantiomorphs thereof to DL-α-lipoic acid and the (+) and (−) enantiomorphs. Essentially, this process comprises reacting a 6,6'-dithiobis (8-hydroxyoctanoic acid) with thiourea or an N-substituted thiourea in the presence of a strong non-oxidizing acid saponifying and oxidizing the resulting compound thereby producing DL-α-lipoic acid or the (+) and (−) enantiomorphs thereof.

The reaction of 6,6' - dithiobis (8 - hydroxyoctanoic acid), the thiourea and a strong acid may be conveniently effected in aqueous solution at room or elevated temperatures, preferably the reflux temperature. Non-oxidizing mineral acids and Lewis acids may be conveniently used in the reaction. After the reaction is completed, which requires from about 3 to 20 hours, a base is conveniently added to saponify the mixture.

The reaction product is then separated and purified by extraction with an immiscible organic solvent and preferably by a final extraction with chloroform. By oxidation of the reaction product in the presence of an inert aqueous organic solvent, preferably chloroform, there is obtained α-lipoic acid in the DL or (+) and (—) enantiomorphic forms according to the reactants employed. In this regard, (+)-α-lipoic acid is obtained starting with (—) - 6,6' - dithiobis (8 - hydroxyoctanoic acid) and (—)-α-lipoic acid is produced from the corresponding (+) enantiomorph thereof. In effecting the said oxidation it is preferred to employ a mild oxidizing agent such as iodine-potassium iodide. The reaction is completed quickly and α-lipoic acid may be recovered by conventional methods.

In a further embodiment of the present invention 6,6' - dithiobis(8 - thiooctanoic acid) and 8,8' - dithiobis (6-thiooctanoic acid) may be treated with metallic sodium in liquid ammonia or with an alkali metal borohydride to produce the corresponding trisodium salts of 6,8-dithiooctanoic acid. Acidification of the salt and subsequent oxidation by known means of the resulting 6,8-dithiooctanoic acid gives DL-α-lipoic acid.

Although it is considered that the invention and means for its practice have been fully and completely disclosed above, nevertheless the following examples are added to illustrate specific embodiments of the invention. It is understood, however, that these examples in no way limit or are intended to limit the scope of the invention.

EXAMPLE 1

*DL-6,6'-dithiobis(8-hydroxyoctanoic acid)*

An aqueous solution of about 12 g. of 6-thiol-8-hydroxyoctanoic acid is oxidized with 10% iodine-potassium iodide solution and the excess iodine is reduced with sodium thiosulfate. Isolation of 6,6'-dithiobis (8-hydroxyoctanoic acid) from the reaction mixture is effected by extraction with ethyl acetate and extraction of the organic layer with saturated aqueous sodium bicarbonate. The bicarbonate extract containing the sodium salt of 6,6'-dithiobis (8-hydroxyoctanoic acid) is acidified to pH 3 with hydrochloric acid and extracted with ethyl acetate. The ethyl acetate extract is dried over sodium sulfate and evaporated to dryness under reduced pressure to yield the product having a neutralization equivalent of 199; (calc. 191).

This procedure is also followed starting with 6-hydroxy-8-thiooctanoic acid to produce 8,8'-dithiobis (6-hydroxyoctanoic acid).

EXAMPLE 2

*(—)-6,6'-dithiobis (8-hydroxyoctanoic acid)*

8.2 grams of ethyl 6-acetylthio-8-hydroxyoctanoic acid, derived from (+)-7-carboethoxy-3-acetylthioheptanoic acid, is dissolved in 30 ml. of methanol and 14 ml. of 30% aqueous sodium hydroxide. A small amount of zinc dust is added and the mixture is refluxed for 30 minutes. The reaction mixture is filtered, adjusted to pH 7 and oxidized as in Example 1 to recover (—) - 6,6' - dithiobis (8 - hydroxyoctanoic acid); $[\alpha]_D^{23} -54°$ (c, 2; CH$_3$OH).

EXAMPLE 3

*(+)6,6'-dithiobis(8-hydroxyoctanoic acid)*

15 grams of ethyl 6-acetylthio-8-hydroxyoctanoate, derived from (—)-7-carboethoxy-3-acetylthioheptanoic acid, is dissolved in 60 ml. of methanol and 28 ml. of 30% aqueous sodium hydroxide. Following the addition of 750 mg. of zinc dust the mixture is refluxed and converted to (+) - 6,6' - dithiobis (8 - hydroxyoctanoic acid) as in Example 2; $[\alpha]_D^{23} +52°$ (c, 2; CH$_3$OH).

EXAMPLE 4

*Diethyl DL-6,6'-dithiobis (8-hydroxyoctanoate)*

20 grams of ethyl 6-thiol-8-hydroxyoctanoate is dissolved in 100 ml. of ethyl acetate and oxidized with 10% aqueous iodine-potassium iodide. The excess iodine is reduced with aqueous sodium bisulfite and the ethyl acetate solution is washed with water and dried over anhydrous magnesium sulfate. The solution on concentration under diminished pressure gives quantitative yields of diethyl DL-6,6'-dithiobis-(8-hydroxyoctanoate).

The individual enantiomorphs: diethyl (+)-6,6'-dithiobis (8-hydroxyoctanoate) and diethyl (—)-6,6'-dithiobis (8-hydroxyoctanoate), are prepared according to this procedure from the optical isomers of ethyl 6-thiol-8-hydroxyoctanoate.

EXAMPLE 5

*Dipropyl DL-6,6'-dithiobis(8-hydroxyoctanoate)*

About 5 g. of propyl-DL-6-thiol-8-hydroxyoctanoate is dissolved in 40 ml. of ethyl acetate and oxidized with aqueous iodine-potassium iodide. The excess iodine is reduced with sodium bisulfite. By evaporation of the solvent dipropyl DL-6,6'-dithiobis-(8-hydroxyoctanoate) is recovered.

This procedure is followed starting with other esters of DL-6-thiol-8-hydroxyoctanoate to form the corresponding diesters of DL-6,6'-dithiobis (8-hydroxyoctanoate) such as the dibutyl, diphenyl, dibenzyl and diphenylethyl esters thereof.

EXAMPLE 6

*DL-6,6'-dithiobis (8-thiooctanoic acid)*

About 4 g. of 6,6'-dithiobis-(8-hydroxyoctanoic acid), 3 g. of thiourea and 20 ml. of 40% aqueous hydrobromic acid are refluxed for 15 hours at 150° C. The reaction mixture containing 6,6'-dithiobis {8-[2(2-thiopseudoureido)]octanoic acid} dihydrobromide is made 0.5 N with sodium hydroxide and refluxed for 30 minutes. The mixture containing the tetrasodium salt of 6,6'-dithiobis (8-thiooctanoic acid) is then cooled and acidified to pH 3 with concentrated hydrochloric acid to form 6,6'-dithiobis (8-thiooctanoic acid). The product is isolated by extraction with ethyl acetate, drying the extract over sodium sulfate, filtering and evaporation of the solvent under reduced pressure.

By the enzymatic activity assay the product showed α-lipoic acid activity ranging from 150,000 to 500,000 yeast units/mg.

The procedure of this example is employed starting with 8,8'-dithiobis (6-hydroxyoctanoic acid) and reacting it with thiourea and hydrobromic acid to form 8,8'-dithiobis {6-[2(2-thiopseudoureido)]octanoic acid} dihydrobromide, hydrolyzing said compound with sodium hydroxide to form the tetrasodium salt of 8,8'-dithiobis (6-thiooctanoic acid) and acidifying said salt with hydrochloric acid to form 8,8'-dithiobis (6-thiooctanoic acid) which is then isolated by conventional methods.

EXAMPLE 7

*6,6'-dithiobis (8-thiooctanoic acid) derived from (—)-6,6'-dithiobis (8-hydroxyoctanoic acid)*

5 grams of (—)-6,6'-dithiobis (8-hydroxyoctanoic acid) is reacted with 8 g. of thiourea and 26 ml. of 40% aqueous hydrobromic acid as in Example 6. The reaction mixture containing the optically active 6,6-dithiobis {8-[2(2-thiopseudoureido)]octanoic acid} dihydrobromide is then treated with dilute potassium hydroxide to form the tetrapotassium salt of optically active 6,6'-dithiobis (8-thiooctanoic acid). The reaction mixture is then acidified with hydrochloric acid to obtain the optically active 6,6'-dithiobis (8-thiooctanoic acid).

EXAMPLE 8

*6,6'-dithiobis (8-thioloctanoic acid) derived from (+)-6,6'-dithiobis (8-hydroxyoctanoic acid)*

11.9 grams of (+)-6,6'-dithiobis (8-hydroxyoctanoic acid), 19.2 g. of thiourea and 65.5 ml. of 40% aqueous hydrobromic acid are mixed and reacted as in Example 6. To the reaction mixture containing the optically active 6,6'-dithiobis {8-[2(2-thiopseudoureido)] octanoic acid} dihydrobromide is added dilute sodium hydroxide to form the optically active tetrasodium salt of 6,6'-dithiobis (8-thioloctanoic acid). Hydrochloric acid is added to acidify the mixture and obtain optically active 6,6'-dithiobis (8-thioloctanoic acid).

EXAMPLE 9

*DL-α-lipoic acid from 6,6'-dithiobis (8-hydroxyoctanoic acid)*

8.1 grams of 6,6'-dithiobis (8-hydroxyoctanoic acid), 12.6 g. of thiourea and 42 ml. of 40% aqueous hydrobromic acid are mixed and refluxed for seventeen hours. The acidic reaction mixture is neutralized with 30% aqueous sodium hydroxide and made 1 N with respect to sodium hydroxide. The mixture is refluxed for fifteen minutes and after cooling is acidified to pH 3 with concentrated hydrochloric acid. The reaction product is isolated by ethyl acetate extraction followed by bicarbonate extraction, acidification to pH 3 and extraction with ethyl acetate to yield 6.2 g. of oil. The residual oil is extracted with 100 ml. of chloroform and the chloroform solution is oxidized with iodine-potassium iodide. The excess iodine is reduced with dilute aqueous sodium bisulfite and the chloroform solution is washed with water and dried over anhydrous magnesium sulfate. The solution is evaporated under reduced pressure to yield an oil which is treated with two 25 ml. portions of hot cyclohexane. The combined cyclohexane extracts are cooled to separate DL-α-lipoic acid; M. P. 60–61° C.; λ max. in methanol is 3350 A. (E=150).

EXAMPLE 10

*(+)-α-Lipoic acid from (−)-6,6'-dithiobis(8-hydroxyoctanoic acid)*

5 grams of (−)-6,6'-dithiobis-(8-hydroxyoctanoic acid) is reacted with 8 g. of thiourea and 26 ml. of 40% aqueous hydrobromic acid followed by alkaline hydrolysis. The reaction product is isolated as in Example 9. The chloroform soluble fraction is oxidized with 10% aqueous iodine-potassium iodide. After reducing the excess iodine, washing with water and drying over anhydrous magnesium sulfate, the chloroform solution is concentrated under reduced pressure to yield 1.1 g. of oil. This residual oil is titurated with 20 ml. of hot cyclohexane and the solution is cooled to yield 500 mg. of (+)-α-lipoic acid; M. P. 45.5–47.5° C.; $[\alpha]_D^{23} = +90°$ (c, 0.95; benzene); λ max. in methanol=3330 A. (E=150).

EXAMPLE 11

*(−)-α-Lipoic acid from (+)-6,6'-dithiobis(8-hydroxyoctanoic acid)*

11.9 grams of (+)-6,6'-dithiobis(8-hydroxyoctanoic acid), 19.2 g. of thiourea and 65.5 ml. of 40% aqueous hydrobromic acid are mixed and reacted and worked up as in Example 9. The chloroform soluble fraction is treated as in Example 9 to yield 0.8 g. of (−)-α-lipoic acid; M. P. 45–47.5° C.; $[\alpha]_D^{23} = -113°$ (c, 1.88; methanol).

Various changes and modifications of the invention can be made and, to the extent that such variations incorporate the spirit of this invention, they are intended to be included within the scope of the appended claims.

What is claimed is:

1. A disulfide compound selected from the group consisting of compounds of the formula

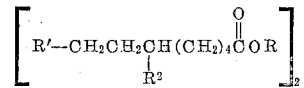

wherein R is a member of the group consisting of hydrogen, and an alkyl, alkenyl, aryl and aralkyl group containing from one to eight carbon atoms, and R' and R² are members of the group consisting of thio and hydroxy groups, one of the groups represented by R' and R² being thio.

2. 6,6'-dithiobis (8-hydroxyoctanoic acid).
3. (+)-6,6'-dithiobis (8-hydroxyoctanoic acid).
4. (−)-6,6'-dithiobis (8-hydroxyoctanoic acid).
5. 8,8'-dithiobis (6-hydroxyoctanoic acid).
6. Di lower alkyl 6,6'-dithiobis (8-hydroxyoctanoate).
7. Diethyl 6,6'-dithiobis (8-hydroxyoctanoate).
8. The process which comprises reacting a compound of the formula

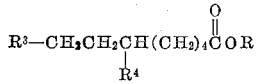

wherein R is a member of the group consisting of hydrogen, and an alkyl, alkenyl, aryl and aralkyl group containing from one to eight carbon atoms, and R³ and R⁴ represent members of the group consisting of thiol and hydroxy groups, one of the groups represented by R³ and R⁴ being thiol, with a mild oxidizing agent comprising a mixture of iodine and potassium iodide to form the corresponding disulfide of the formula

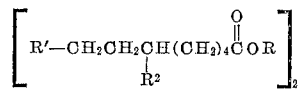

wherein R has the significance previously assigned, and R' and R² are members of the group consisting of thio and hydroxy groups, one of the groups represented by R' and R² being thio.

9. The process which comprises oxidizing 6-thiol-8-hydroxyoctanoic acid with a mild oxidizing agent comprising a mixture of iodine and potassium iodide to form 6,6'-dithiobis (8-hydroxyoctanoic acid).

10. The process which comprises oxidizing 8-thiol-6-hydroxyoctanoic acid with a mild oxidizing agent comprising a mixture of iodine and potassium iodide to form 8-8'-dithiobis (6-hydroxyoctanoic acid).

11. The process which comprises oxidizing lower alkyl 6-thiol-8-hydroxyoctanoate with a mild oxidizing agent comprising a mixture of iodine and potassium iodide to form dialkyl 6,6'-dithiobis (8-hydroxyoctanoate).

12. A disulfide compound selected from the group consisting of compounds of the formula

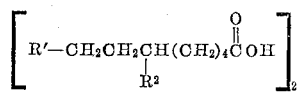

and mineral acid addition salts thereof, wherein R' and R² represent members of the group consisting of thiopseudoureido, N-lower alkyl thiopseudoureido, N-lower aryl thiopseudoureido, N-lower aralkyl thiopseudoureido, and thio groups, one of which group is thio.

13. 6,6' - dithiobis{8 - [2 - (2 - thiopseudoureido)] octanoic acid}.

14. A mineral acid addition salt of 6,6'-dithiobis{-[2-(2-thiopseudoureido)] octanoic acid}.

15. 8,8' - dithiobis{6 - [2(2 - thiopseudoureido)] octanoic acid}.

16. A mineral acid addition salt of 8,8'-dithiobis{6-[2(2-thiopseudoureido)]octanoic acid}.

17. The process which comprises reacting a disulfide of the formula

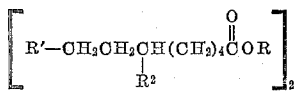

wherein R is a member of the group consisting of hydrogen, and an alkyl, alkenyl, aryl and aralkyl group containing from one to eight carbon atoms, and R' and R² are members of the group consisting of thio and hydroxy groups, one of the groups represented by R' and R² being thio, with a member of the group consisting of thiourea and N-lower alkyl, N-lower aryl and N-lower aralkyl substituted thioureas in the presence of a strong nonoxidizing mineral acid to form an acid addition salt of a compound of the formula

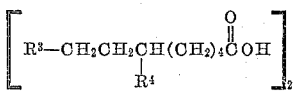

wherein $R^3$ and $R^4$ are members of the group consisting of thio, thiopseudoureido and N-lower alkyl, N-lower aryl and N-lower aralkyl substituted thiopseudoureido groups, one of the groups represented by $R^3$ and $R^4$ being thio.

18. The process which comprises reacting 6,6'-dithiobis (8-hydroxyoctanoic acid) with thiourea in the presence of a strong nonoxidizing mineral acid to form the corresponding acid addition salt of 6,6'-dithiobis{8-[2(2-thiopseudoureido)]octanoic acid}.

19. The process which comprises reacting 8,8'-dithiobis (6-hydroxyoctanoic acid) with thiourea in the presence of a strong nonoxidiznig mineral acid to form the corresponding acid addition salt of 8,8'-dithiobis{6-[2(2-thiopseudoureido)]octanoic acid}.

20. The process which comprises treating a mineral acid addition salt of a compound of the formula

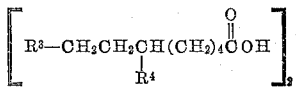

wherein $R^3$ and $R^4$ are members of the group consisting of thio, thiopseudoureido and N-lower alkyl thiopseudoureido, N-lower aryl thiopseudoureido, and N-lower aralkyl thiopseudoureido, one of the groups represented by $R^3$ and $R^4$ always being thio, with a sufficient amount of an inorganic base to neutralize the acid of addition and form the free base of the compound having said formula.

21. The process which comprises treating a mineral acid addition salt of 6,6'-dithiobis{8-[2(2-thiopseudoureido)]octanoic acid} with a sufficient amount of an inorganic base to neutralize the acid of addition and form the free base 6,6'-dithiobis 8-[2(2-thiopseudoureido)]octanoic acid.

22. The process which comprises treating a mineral acid addition salt of 8,8'-dithiobis{6-[2(2-thiopseudoureido)]octanoic acid} with a sufficient amount of an inorganic base to neutralize the acid of addition and form the free base 8,8'-dithiobis 6-[2(2-thiopseudoureido)] octanoic acid.

23. A disulfide compound of the group consisting of 6,6'-dithiobis (8-thioloctanoic acid), 8,8'-dithiobis (6-thioloctanoic acid) and tetrametal salts thereof.

24. 6,6'-dithiobis (8-thioloctanoic acid).

25. (+)-6,6'-dithiobis (8-thioloctanoic acid).

26. (−)-6,6'-dithiobis (8-thioloctanoic acid).

27. 8,8'-dithiobis (6-thioloctanoic acid).

28. An alkali tetrametal salt of 6,6'-dithiobis (8-thioloctanoic acid).

29. An alkali tetrametal salt of 8,8'-dithiobis (6-thioloctanoic acid).

30. The process which comprises reacting a compound of the formula

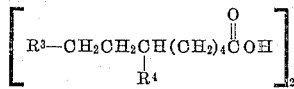

and mineral acid addition salts thereof, wherein $R^3$ and $R^4$ are members of the group consisting of thio, thiopseudoureido and N-lower alkyl, N-lower aryl and N-lower aralkyl thiopseudoureido groups, one of the groups represented by $R^3$ and $R^4$ being thio, with an inorganic base in at least sufficient quantity to form a tetrametal salt of a compound of the group consisting of 6,6'-dithiobis (8-thioloctanoic acid) and 8,8'-dithiobis (6-thioloctanoic acid) and reacting said tetrametal salt with a mineral acid to form the corresponding free acid of the group consisting of 6,6'-dithiobis (8-thioloctanoic acid) and 8,8'-dithiobis (6-thioloctanoic acid) and reacting said tetrametal salt with a mineral acid to form the corresponding free acid of the group consisting of 6,6'-dithiobis (8-thioloctanoic acid) and 8,8'-dithiobis (6-thioloctanoic acid).

31. The process which comprises reacting a mineral acid addition salt of 6,6'-dithiobis{8-[2(2-thiopseudoureido)]octanoic acid} with an inorganic base to form a tetrametal salt of 6,6'-dithiobis (8-thioloctanoic acid) and reacting said tetrametal salt with a mineral acid to form 6,6'-dithiobis (8-thioloctanoic acid).

32. The process which comprises reacting a mineral acid addition salt of 8,8'-dithiobis{6-[2(2-thiopseudoureido)]octanoic acid} with an inorganic base to form a tetrametal salt of 8,8'-dithiobis (6-thioloctanoic acid) and reacting said tetrametal salt with a mineral acid to form 8,8'-dithiobis (6-thioloctanoic acid).

References Cited in the file of this patent

UNITED STATES PATENTS

| | | |
|---|---|---|
| 2,422,246 | Lazeir et al. | June 17, 1947 |
| 2,649,416 | Richter et al. | Aug. 18, 1953 |

OTHER REFERENCES

Bullock: J. A. C. S., 74:3455 (1952).
Nicolet et al.: J. A. C. S., 49:2065.